J. C. CRITCHETT.
HYDROCARBON BURNER.
APPLICATION FILED FEB. 12, 1919.
1,336,285.
Patented Apr. 6, 1920.
2 SHEETS—SHEET 1.
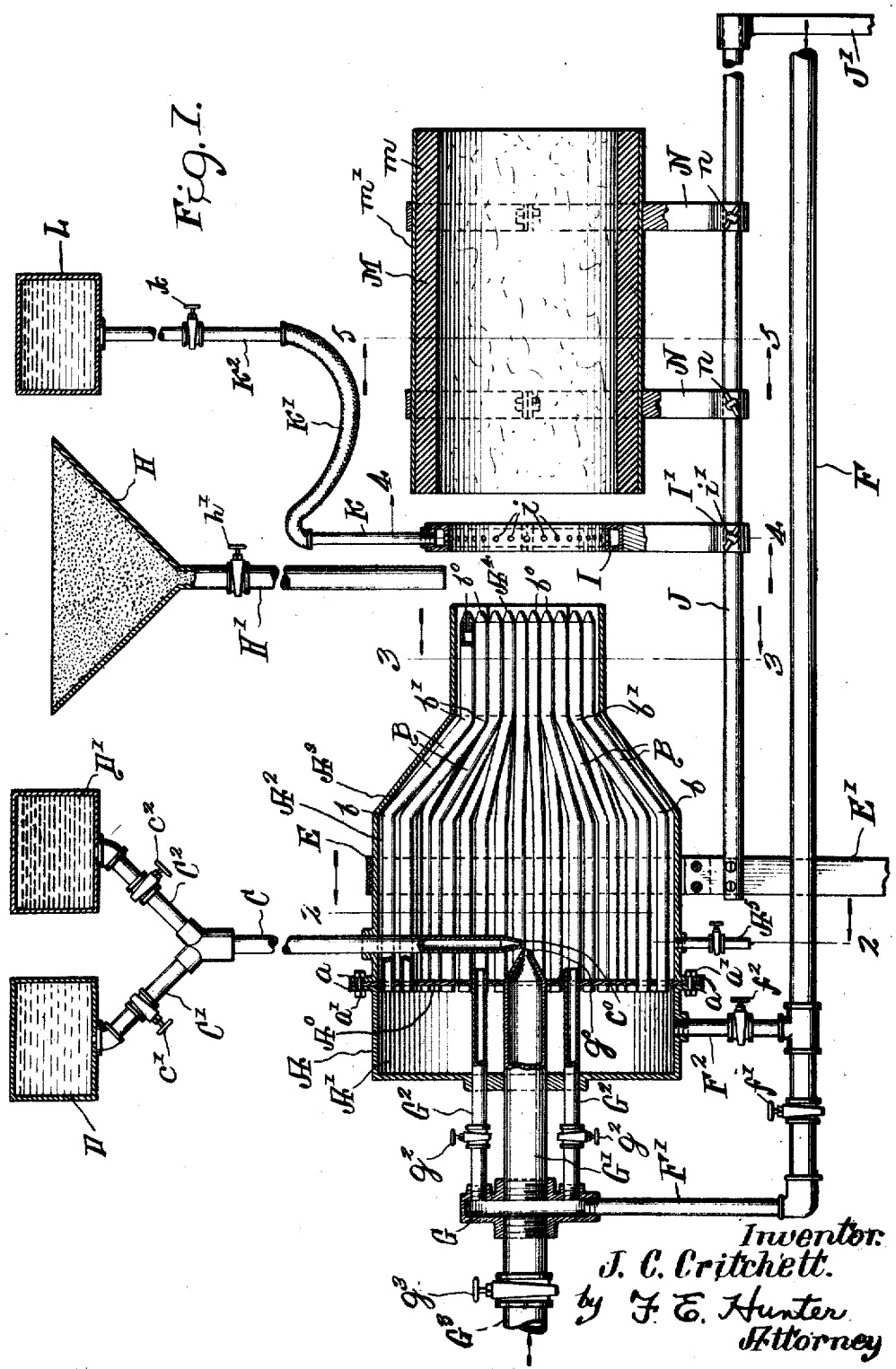

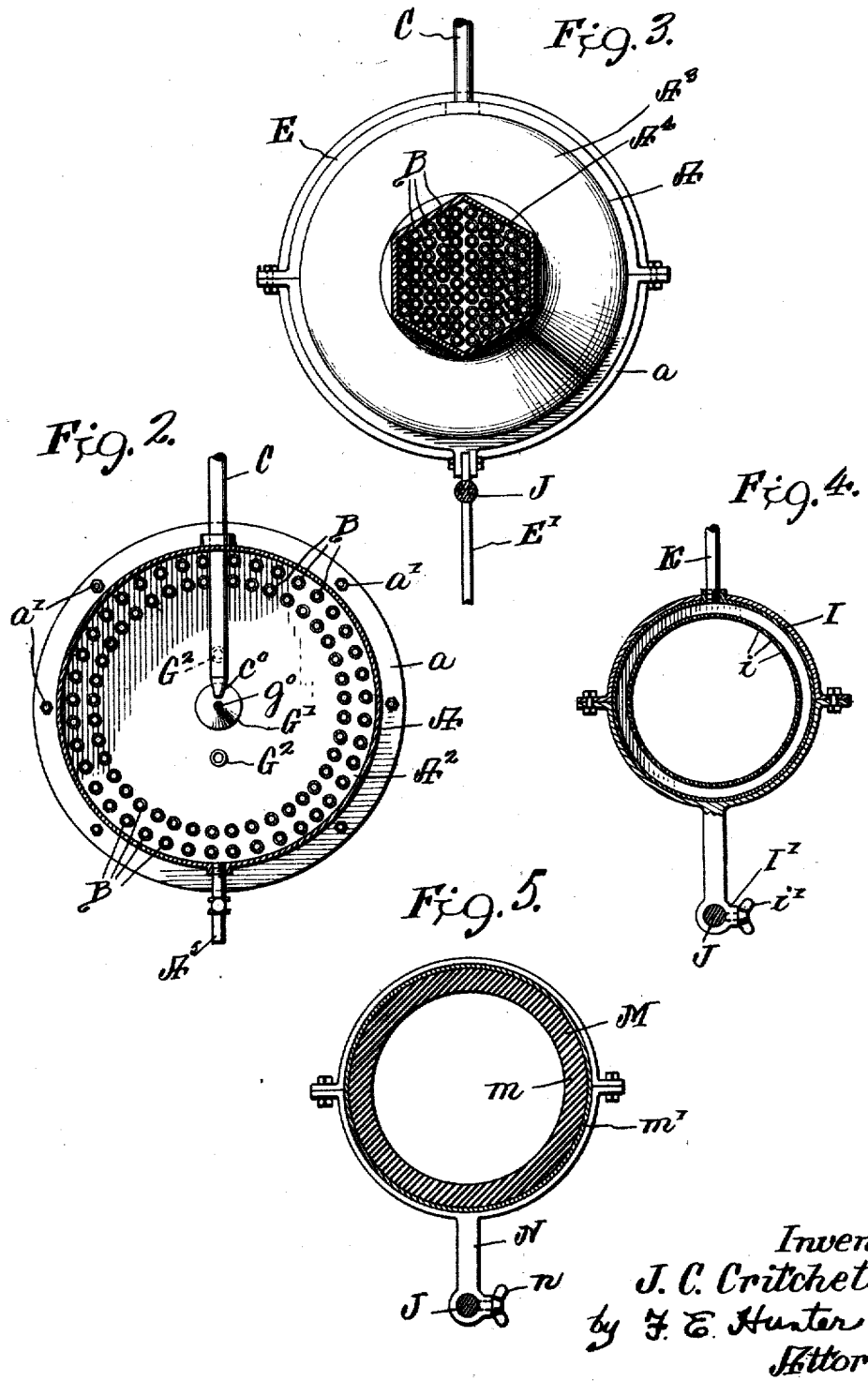

UNITED STATES PATENT OFFICE.

JAMES C. CRITCHETT, OF EL PASO, TEXAS.

HYDROCARBON-BURNER.

1,336,285.  Specification of Letters Patent.  Patented Apr. 6, 1920.

Application filed February 12, 1919. Serial No. 276,556.

*To all whom it may concern:*

Be it known that I, JAMES C. CRITCHETT, a citizen of the United States, residing at El Paso, in the county of El Paso and State of Texas, have invented certain new and useful Improvements in Hydrocarbon-Burners; and I do hereby declare the following to be a full, clear, and exact description of the invention, such as will enable others skilled in the art to which it appertains to make and use the same.

My present invention relates to improvements in hydrocarbon burners of that general type in which finely divided fuel, whether liquid, gaseous, or solid, or one comprising a mixture of two or more of these kinds of fuel, is intimately mixed with air and ignited, and in which the combustion is made complete.

According to my present invention I provide an apparatus which is especially adapted to burn a mixture of crude oil and gas, or crude oil and a lighter oil intimately mixed with air; and to inject into the flame from this mixture finely divided particles of solid fuel, such as coal dust, charcoal dust, or the like; and then to add the sprays of liquid fuel or jets of combustible gas so that a high heat may be quickly attained and constantly maintained, and whereby this heat may be conveniently controlled or regulated, or cut off altogether.

My invention will be more fully understood after reference to the accompanying drawings, in which similar parts are indicated by similar reference symbols throughout the several views, and in which:—

Figure 1 is a sectional diagrammatic view showing the complete apparatus exclusive of the furnace.

Fig. 2 shows a section along the line 2—2 of Fig. 1, and looking in the direction of the arrows.

Fig. 3 shows a section along the line 3—3 of Fig. 1, and looking in the direction of the arrows.

Fig. 4 shows a section along the line 4—4 of Fig. 1, and looking in the direction of the arrows; and Fig. 5 shows a section along the line 5—5 of Fig. 1, and looking in the direction of the arrows.

A represents a hollow shell provided with a rear chamber $A'$ for the air to be supplied to the apparatus, and a front or mixing chamber $A^2$, which chambers are separated from each other by the diaphragm $A^0$ held between the flanges $a$ by means of the bolts $a'$.

The chamber $A^2$ is tapered toward its forward end, as at $A^3$, and terminates in the contracted open end $A^4$ which is preferably hexagonal in shape, for reasons hereinafter to be described.

The mixing chamber is provided with a drain pipe $A^5$ to carry off any liquid fuel, condensed steam, or other similar waste product.

Mounted in this main mixing chamber A are the series of air pipes B, which project rearward through the diaphragm $A^0$ into the air chamber $A'$, and these pipes are bent forwardly, as at $b$ and $b'$ and terminate in the nozzles $b^0$. By having the forward end of the main mixing chamber A of hexagonal form, the forward ends of the pipes B may be more compactly mounted therein, leaving small passages between said pipes, and thus serving to cause the mixture of air and fuel passing in the space between said pipes to follow narrower passages, and hence become more intimately mixed.

The fuel is fed into the mixing chamber through the nozzle $c^0$ at the end of the pipe C, which is connected by the branch pipes $C'$ and $C^2$ to the sources of fuel supply D and $D'$, the openings in these pipes $C'$ and $C^2$ being controlled by the valves $c'$ and $c^2$.

The reservoirs D and $D'$ are shown diagrammatically; the reservoir D may contain either light oil or gas under pressure, and the reservoir $D'$ preferably contains heavier oil, such as crude oil. The mixing chamber A may be supported in any convenient way, as by means of the band E carried by the support $E'$, as shown in Figs. 1 and 3.

Hot air is brought from the furnace, or other convenient source of air supply, through the pipe F and escapes therefrom through the pipes $F'$ and $F^2$, controlled, respectively, by the valves $f'$ and $f^2$. The pipe $F^2$ opens directly into the air chamber $A'$ and the pipe $F'$ opens into the chamber G, in which the pipe $G'$ opens at its rear end and at its forward end said pipe $G'$ terminates in a nozzle $g^0$. This nozzle opens into the chamber $A^2$ in the space between the pipes B.

In order to secure a further supply of air in the space just referred to, I provide one or more air pipes $G^2$ which may be controlled by valves $g^2$. Additional air under pressure may be supplied, if desired, by the pipe $G^3$ controlled by the valve $g^3$.

H represents a hopper provided with fuel, such as coal dust, charcoal dust, or the like, which is fed through the pipe H' controlled by the valve $h'$ and is supplied in front of the nozzles $b^0$. In front of this pipe H' I provide one or more hollow sliding rings I, perforated as at $i$, and adjustably clamped as at I' by means of the set screw $i'$ on the bar J. Liquid or gaseous fuel is fed to this hollow perforated ring I through the pipe K, the flexible connection K' and the pipe $K^2$ from the reservoir L shown diagrammatically in Fig. 1. The passage through this pipe $K^2$ is controlled by means of the valve $k$.

M represents the combustion chamber, preferably in the form of a hollow cylinder with refractory lining $m$ and a metal case $m'$, which combustion chamber may be held in suitable supports N, which may be moved longitudinally on the bar J and set at the desired position by means of the set screw $n$. This combustion chamber should be arranged close in front of the burner ring I and have its outer end projecting into the mouth of the furnace or heating chamber, not shown.

The bar J may be supported in any convenient way as by means of the support E' at one end and the support J' at the other, as shown in Fig. 1.

The operation of the complete apparatus is as follows:

A limited amount of air is supplied to the chamber A' and to the chamber G from either or both of the pipes F or $G^3$, and a limited amount of fuel, preferably light oil or gas, is supplied through the nozzle $c^0$, and the air and fuel mixed are blown through the spaces between the pipes B, and also air escapes through the nozzles $b^0$, and the burner may be lighted in front of these nozzles $b^0$. Once lighted, the supply of air and fuel may be increased until the device is running at full blast, the supply of lighter oil or gas from the reservoir D being controlled by the valve $c'$, and the supply of crude oil from the reservoir D' being controlled by the valve $c^2$. These two will be intimately mixed in the main mixing chamber with the air coming in through the nozzle $g^0$ and the pipes $G^2$, and the mixed air and fuel will pass the nozzles $b^0$ which will add still further air in finely divided form, and the mixture will burn fiercely.

Into this burning mixture pulverized solid fuel is dropped through the pipe H' and the ignited mass is blown forward through the hollow ring I, and the liquid fuel or gas from the reservoir L will come in finely divided streams through the perforations $i$, forming a fiercely burning mixture, and the combustion will be completed in the combustion chamber M whence the highly heated products of combustion will be delivered to the furnace or heating chamber not shown.

I claim no invention in any particular form of furnace or heating chamber, since the apparatus may be used with a great variety of types.

The position of the ring I relative to the nozzles $b^0$ and the pipe H' may be adjusted by moving the said ring backward or forward on the bar J, and similarly the position of the combustion chamber M may be varied by moving the same backward or forward on said bar J.

While I have shown one ring I, it will be obvious that a plurality of rings may be used if desired.

If it be desired to secure greater cross sectional area for the escape of the mixture of air and fuel from the mixing chamber $A^2$, it will be obvious that some of the pipes B may be cut away, as at $b'$, leaving the nozzles $b^0$ projecting forward, and the rear portion of said pipes removed, in which case the perforations in the diaphragm $A^0$ for the missing pipes should be closed or not provided at all.

In order to clean out the apparatus the rear chamber A' may be removed from the mixing chamber by taking out the bolts $a'$ and removing the diaphragm $A^0$ and the parts carried thereby.

It will be noted that the pipe $G^3$ may be closed and hot air alone may be used from the pipe F, or the valve $g^3$ may be wholly or partly opened permitting air to come in through the pipe $G^3$ and mingle with the hot air from the pipe F. The pipe F may pass through or around the furnace, or hot air may be supplied from any convenient source not shown.

It will be obvious that various modifications might be made in the herein described apparatus, and in the construction, combination and arrangement of parts which could be used without departing from the spirit of my invention, and I do not intend to limit the invention to such details except as particularly pointed out in the claims.

Having thus described my invention what I claim and desire to secure by Letters Patent of the United States is:—

1. Apparatus of the character described, comprising a hollow shell provided with a diaphragm separating the same into an air chamber and a mixing chamber, a series of pipes leading from said air chamber through said mixing chamber and provided with nozzles spaced apart at their forward ends, means for supplying fluid fuel in a finely divided form to said mixing chamber, means for supplying air under pressure to the rear end of said mixing chamber, causing the mixture of fuel and air to pass through the spaces between said nozzles, substantially as described.

2. Apparatus of the character described, comprising a hollow shell provided with a diaphragm separating the same into an air chamber and a mixing chamber, a series of pipes leading from said air chamber through said mixing chamber and provided with nozzles at their forward ends, said pipes being bent inward from said diaphragm toward said nozzles to form constricted passages for the fuel mixture, means for supplying fluid fuel in a finely divided form to said mixing chamber, means for supplying air under pressure to the rear end of said mixing chamber, causing the mixture of fuel and air to pass through the spaces between said nozzles, substantially as described.

3. Apparatus of the character described, comprising a hollow shell provided with a diaphragm separating the same into an air chamber and a mixing chamber, a series of pipes leading from said air chamber through said mixing chamber and provided with nozzles spaced apart at their forward ends, means for supplying a mixture of crude oil and another fluid fuel in a finely divided form to said mixing chamber, means for supplying air under pressure to the rear end of said mixing chamber, causing the mixture of fuel and air to pass through the spaces between said nozzles, substantially as described.

4. Apparatus of the character described, comprising a hollow shell provided with a diaphragm separating the same into an air chamber and a mixing chamber, a series of pipes leading from said air chamber through said mixing chamber and provided with nozzles at their forward ends, said pipes being bent inward from said diaphragm toward said nozzles to form constricted passages for the fuel mixture, means for supplying a mixture of crude oil and another fluid fuel in a finely divided form to said mixing chamber, means for supplying air under pressure to the rear end of said mixing chamber, causing the mixture of fuel and air to pass through the spaces between said nozzles, substantially as described.

5. Apparatus of the character described, comprising a hollow shell provided with a diaphragm separating the same into an air chamber and a mixing chamber, a series of pipes leading from said air chamber through said mixing chamber and provided with nozzles spaced apart at their forward ends, means for supplying fluid fuel in a finely divided form to said mixing chamber, means for supplying air under pressure to the rear end of said mixing chamber, causing the mixture of fuel and air to pass through the spaces between said nozzles, a hollow ring with a series of perforations on the interior thereof mounted in front of said nozzles, means for supplying fluid fuel under pressure to said ring, and means for supplying pulverized solid fuel between said nozzles and said ring, substantially as described.

6. Apparatus of the character described, comprising a hollow shell provided with a diaphragm separating the same into an air chamber and a mixing chamber, a series of pipes leading from said air chamber through said mixing chamber and provided with nozzles at their forward ends, said pipes being bent inward from said diaphragm toward said nozzles to form constricted passages for the fuel mixture, means for supplying fluid fuel in a finely divided form to said mixing chamber, means for supplying air under pressure to the rear end of said mixing chamber, causing the mixture of fuel and air to pass through the spaces between said nozzles, a hollow ring with a series of perforations on the interior thereof mounted in front of said nozzles, means for supplying fluid fuel under pressure to said ring, and means for supplying pulverized solid fuel between said nozzles and said ring, substantially as described.

7. Apparatus of the character described, comprising a hollow shell provided with a diaphragm separating the same into an air chamber and a mixing chamber, a series of pipes leading from said air chamber through said mixing chamber and provided with nozzles spaced apart at their forward ends, means for supplying a mixture of crude oil and another fluid fuel in a finely divided form to said mixing chamber, means for supplying air under pressure to the rear end of said mixing chamber, causing the mixture of fuel and air to pass through the spaces between said nozzles, a hollow ring with a series of perforations on the interior thereof mounted in front of said nozzles, means for supplying fluid fuel under pressure to said ring, and means for supplying pulverized solid fuel between said nozzles and said ring, substantially as described.

8. Apparatus of the character described, comprising a hollow shell provided with a diaphragm separating the same into an air chamber and a mixing chamber, a series of pipes leading from said air chamber through said mixing chamber and provided with nozzles at their forward ends, said pipes being bent inward from said diaphragm toward said nozzles to form constricted passages for the fuel mixture, means for supplying a mixture of crude oil and another fluid fuel in a finely divided form to said mixing chamber, means for supplying air under pressure to the rear end of said mixing chamber, causing the mixture of fuel and air to pass through the spaces between said nozzles, a hollow ring with a series of perforations on the interior thereof mounted in front of said nozzles, means for supplying fluid fuel under pressure to said ring, and means for supplying pulverized solid fuel between said nozzles and said ring, substantially as described.

9. Apparatus of the character described, comprising a hollow shell provided with a diaphragm separating the same into an air chamber and a mixing chamber, a series of pipes leading from said air chamber through said mixing chamber and provided with nozzles spaced apart at their forward ends, means for supplying fluid fuel in a finely divided form to said mixing chamber, means for supplying air under pressure to the rear end of said mixing chamber, causing the mixture of fuel and air to pass through the spaces between said nozzles, a hollow ring with a series of perforations on the interior thereof adjustably mounted in front of said nozzles, means for supplying fluid fuel under pressure to said ring, means for supplying pulverized solid fuel between said nozzles and said ring, and a combustion chamber in the form of a hollow cylinder open at both ends adjustably mounted in front of said ring, substantially as described.

10. Apparatus of the character described, comprising a hollow shell provided with a diaphragm separating the same into an air chamber and a mixing chamber, a series of pipes leading from said air chamber through said mixing chamber and provided with nozzles at their forward ends, said pipes being bent inward from said diaphragm toward said nozzles to form constricted passages for the fuel mixture, means for supplying fluid fuel in a finely divided form to said mixing chamber, means for supplying air under pressure to the rear end of said mixing chamber, causing the mixture of fuel and air to pass through the spaces between said nozzles, a hollow ring with a series of perforations on the interior thereof adjustably mounted in front of said nozzles, means for supplying fluid fuel under pressure to said ring, means for supplying pulverized solid fuel between said nozzles and said ring, and a combustion chamber in the form of a hollow cylinder open at both ends adjustably mounted in front of said ring, substantially as described.

11. Apparatus of the character described, comprising a hollow shell provided with a diaphragm separating the same into an air chamber and a mixing chamber, a series of pipes leading from said air chamber through said mixing chamber and provided with nozzles at their forward ends, said pipes being bent inward from said diaphragm toward said nozzles to form constricted passages for the fuel mixture, means for supplying a mixture of crude oil and another fluid fuel in a finely divided form to said mixing chamber, means for supplying air under pressure to the rear end of said mixing chamber, causing the mixture of fuel and air to pass through the spaces between said nozzles, a hollow ring with a series of perforations on the interior thereof adjustably mounted in front of said nozzles, means for supplying fluid fuel under pressure to said ring, means for supplying pulverized solid fuel between said nozzles and said ring, and a combustion chamber in the form of a hollow cylinder open at both ends adjustably mounted in front of said ring, substantially as described.

12. Apparatus of the character described, comprising a hollow shell provided with a diaphragm separating the same into an air chamber and a mixing chamber, a series of pipes leading from said air chamber through said mixing chamber and provided with nozzles spaced apart at their forward ends, means for supplying a mixture of crude oil and another fluid fuel in a finely divided form to said mixing chamber, means for supplying air under pressure to the rear end of said mixing chamber, causing the mixture of fuel and air to pass through the spaces between said nozzles, a hollow ring with a series of perforations on the interior thereof adjustably mounted in front of said nozzles, means for supplying fluid fuel under pressure to said ring, means for supplying pulverized solid fuel between said nozzles and said ring, and a combustion chamber in the form of a hollow cylinder open at both ends adjustably mounted in front of said ring, substantially as described.

13. Apparatus of the character described, comprising a mixing chamber, means for supplying a mixture of crude oil and another fluid fuel in a finely divided form to said mixing chamber, means for supplying air under pressure to the rear end of said mixing chamber, and for discharging the mixed air and fuel from the front end of said mixing chamber, a hollow ring with a series of perforations on the interior thereof mounted in front of said mixing chamber, means for supplying fluid fuel under pressure to said ring, and means for supplying pulverized solid fuel between said mixing chamber and said ring, substantially as described.

14. Apparatus of the character described, comprising a mixing chamber, means for supplying a mixture of crude oil and another fluid fuel in a finely divided form to said mixing chamber, means for supplying air under pressure to the rear end of said mixing chamber, and for discharging the mixed air and fuel from the front end of said mixing chamber, a hollow ring with a series of perforations on the interior thereof mounted in front of said mixing chamber, means for supplying fluid fuel under pressure to said ring, means for supplying pulverized solid fuel between said mixing chamber and said ring, and a combustion chamber in the form of a hollow cylinder open at both ends adjustably mounted in front of said ring, substantially as described.

15. Apparatus of the character described, comprising a mixing chamber, means for supplying a mixture of crude oil and any other fluid fuel in a finely divided form to said mixing chamber, means for supplying air under pressure to the rear end of said mixing chamber, and for discharging the mixed air and fuel from the front end of said mixing chamber, a hollow ring with a series of peforations on the interior thereof mounted in front of said mixing chamber, and means for supplying fluid fuel under pressure to said ring, substantially as described.

16. Apparatus of the character described, comprising a mixing chamber, means for supplying a mixture of crude oil and another fluid fuel in a finely divided form to said mixing chamber, means for supplying air under pressure to the rear end of said mixing chamber, and for discharging the mixed air and fuel from the front end of said mixing chamber, a hollow ring with a series of perforations on the interior thereof mounted in front of said mixing chamber, means for supplying fluid fuel under pressure to said ring, and a combustion chamber in the form of a hollow cylinder open at both ends adjustably mounted in front of said ring, substantially as described.

17. Apparatus of the character described, comprising a mixing chamber, means for supplying fluid fuel in a finely divided form to said mixing chamber, means for supplying air under pressure to the rear end of said mixing chamber, and for discharging the mixed air and fuel from the front end of said mixing chamber, a hollow ring with a series of perforations on the interior thereof adjustably mounted in front of said mixing chamber, means for supplying fluid fuel under pressure to said ring, means for supplying pulverized solid fuel between said mixing chamber and said ring, and a combustion chamber in the form of a hollow cylinder open at both ends adjustably mounted in front of said ring, substantially as described.

18. Apparatus of the character described, comprising a mixing chamber, means for supplying fluid fuel in a finely divided form to said mixing chamber, means for supplying air under pressure to the rear end of said mixing chamber, and for discharging the mixed air and fuel from the front end of said mixing chamber, a hollow ring with a series of perforations on the interior thereof adjustably mounted in front of said mixing chamber, means for supplying fluid fuel under pressure to said ring, and a combustion chamber in the form of a hollow cylinder open at both ends adjustably mounted in front of said ring, substantially as described.

In testimony whereof I affix my signature.

JAMES C. CRITCHETT.